United States Patent
Nagashima

[11] Patent Number: 6,122,333
[45] Date of Patent: Sep. 19, 2000

[54] DELAY DETECTION DEMODULATION SYSTEM

[75] Inventor: Katsuya Nagashima, Saitama, Japan

[73] Assignee: NEC Corporation, Tokyo, Japan

[21] Appl. No.: 09/030,939

[22] Filed: Feb. 26, 1998

[30] Foreign Application Priority Data

Feb. 26, 1997 [JP] Japan .................................... 8-041750

[51] Int. Cl.[7] .............................. H04L 1/02; H04L 27/22; H04B 1/10; H04B 17/02
[52] U.S. Cl. .......................... 375/347; 375/349; 375/330; 329/304; 455/137
[58] Field of Search ..................................... 375/347, 349, 375/267, 330, 331, 283; 329/304; 455/132, 137, 272, 273, 303, 65

[56] References Cited

U.S. PATENT DOCUMENTS

| | | | |
|---|---|---|---|
| 5,465,271 | 11/1995 | Hladik et al. | 375/267 |
| 5,553,102 | 9/1996 | Jasper et al. | 375/347 |
| 5,621,769 | 4/1997 | Wan et al. | 375/347 |

FOREIGN PATENT DOCUMENTS

| | | |
|---|---|---|
| 8-32640 | 2/1996 | Japan . |
| 2 314 488 | 12/1997 | United Kingdom . |

*Primary Examiner*—Stephen Chin
*Assistant Examiner*—Betsy L. Deppe
*Attorney, Agent, or Firm*—Scully, Scott, Murphy & Presser

[57] ABSTRACT

Disclosed is a delay detection demodulation system which has: a plurality of receiving systems; a plurality of instantaneous phase detecting circuits for detecting an instantaneous phase from the output of each of the plurality of receiving systems; a plurality of phase difference operating circuits for determining a phase difference in one symbol section from the output of each of the plurality of instantaneous phase detecting circuits; a combining circuit for combining the outputs of the plurality of operating circuits; a delay detection circuit for conducting error diffusion type delay detection after the combining of the combining circuit; and a demodulation logical circuit for conducting demodulation logical operation.

4 Claims, 5 Drawing Sheets

FIG.1 PRIOR ART

DELAY DETECTION DEMODULATION SYSTEM

FIELD OF THE INVENTION

This invention relates to a delay detection demodulation system of diversity type used in a base station for mobile radio transmitter etc.

BACKGROUND OF THE INVENTION

Mobile communication systems use various systems to detect a digital modulated signal. In general, a so-called delay detection system is used since it has a good burst frame efficiency in comparison with heterodyne synchronous detection system and envelop detection system and has a good error ratio characteristic under Rayleigh fading.

in the delay detection system, a digital modulated signal is received as an input signal, and then the input signal is converted into a signal representing a phase change (hereinafter referred to as 'instantaneous phase signal') before, e.g., a demodulator, and then the instantaneous phase signal is input to the demodulator. The demodulator outputs a delayed instantaneous phase signal with a delay of one symbol, and then the instantaneous phase signal and delayed instantaneous phase signal are input to a subtracter to obtain a difference for delay detection, and then the difference is input to a determination circuit to conduct the determination of data, when a delayed instantaneous phase signal to be input one symbol before and an instantaneous phase signal to be input at this time are coincident with each other, a negative value is output, and, when they are not coincident with each other, a positive value is output, and then two-bit data according to the phase of symbol are output. In particular, the delay detection system is suitably used for the demodulation on the receiver side of a communication that is modulated by using DQPSK(differential quadrature phase shift keying).

On the other hand, a demodulation system using error diffusion type delay detection is disclosed in Japanese patent application laid-open No. 8-32640(1996), which describes that, when a received signal with a level sufficiently higher than that of a noise to be superposed on the communication path etc., the data error ratio can be highly improved.

In a base station for mobile stations, when an input signal with a level higher than a predetermined level is transmitted from the mobile stations, a sufficiently accurate data detection can be conducted by using the delay detection system of error diffusion type. However, with the reduction in the level of input signal, the improvement of data error ratio is lowered. When the signal level is further reduced and the superposed noise is increased, the data error ratio may be, on the contrary, deteriorated.

In particular, in case of the combination diversity system with a large diversity effect which has inputs through several antennas, the input signal level to each of the receiving systems when a certain error ratio is obtained is low. Therefore, when the delay detection system of error diffusion type is applied before the operation of combining the input signals from the receiving systems, the improvement of data error ratio may not be obtained at a weak electric field level.

Thus, when the ratio of an input signal level to a noise level superposed on the received signal is low, a receiver conducting the combination diversity cannot obtain a sufficient improvement effect of error ratio even by using the delay detection of error diffusion type.

SUMMARY OF THE INVENTION

Accordingly, it is an object of the invention to provide a delay detection demodulation system where a sufficient improvement effect of data error ratio can be obtained even when the ratio of an input signal level to a noise level superposed on the received signal is low.

According to the invention, adelay detection demodulation system, comprises:

a plurality of diversity type receiving systems;

a plurality of instantaneous phase detecting circuits for detecting an instantaneous phase from the output of each of the plurality of receiving systems;

a plurality of operating circuits for operating a phase difference in one symbol section from the output of each of the plurality of instantaneous phase detecting circuits;

a combining circuit for combining the outputs of the plurality of operating circuits;

a delay detection circuit for conducting error diffusion type delay detection after the combining of the combining circuit; and a demodulation logical circuit for conducting demodulation logical operation.

BRIEF DESCRIPTION OF THE DRAWINGS

The invention will be explained in more detail in conjunction with the appended drawings, wherein.

DESCRIPTION OF THE PREFERRED EMBODIMENTS

Before explaining a delay detection demodulation system in the preferred embodiments, the aforementioned conventional delay detection demodulation system will be explained in FIGS. 1 and 2.

Figure 1:
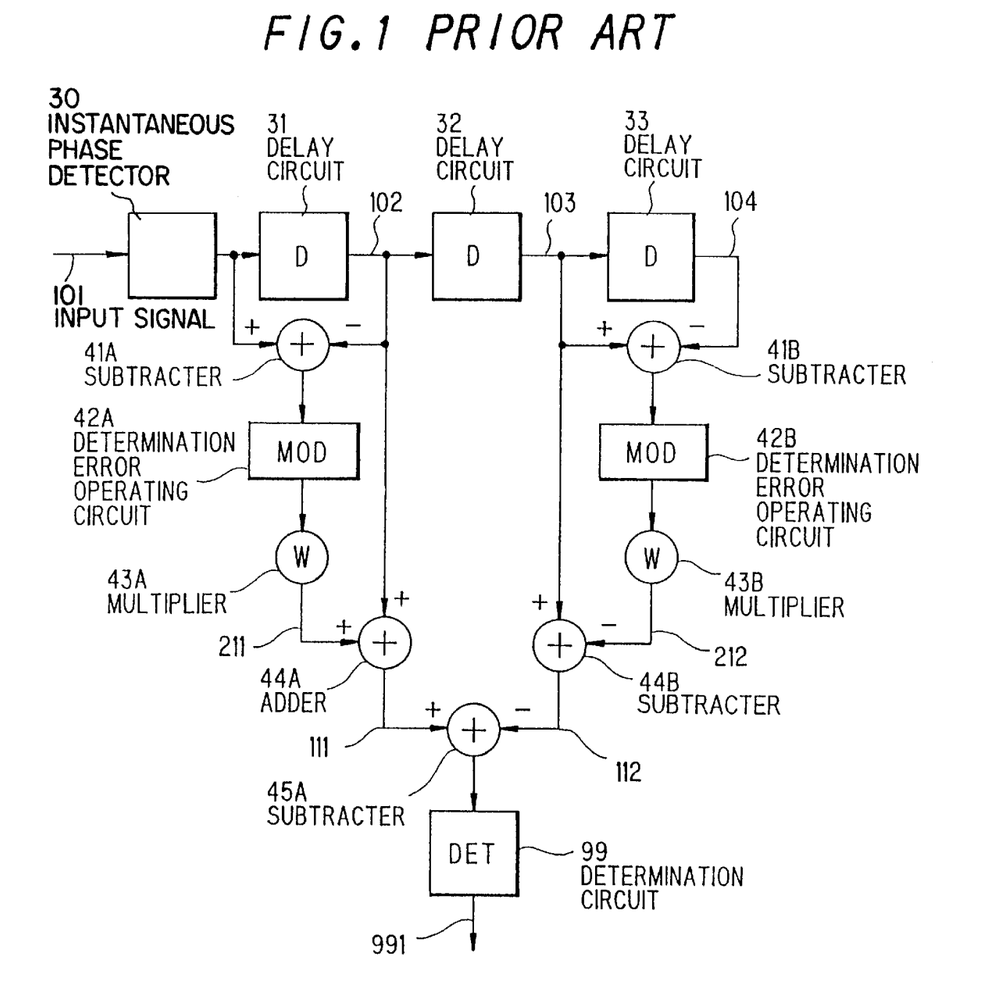
FIG. 1 is a circuit diagram showing a conventional error diffusion type delay detection circuit.

Referring to FIG. 1, the demodulation system in Japanese patent application laid-open No.8-32640 will be detailed. In the conventional delay detection system, a digital modulated signal by, e.g., DQPSK modulation, is input as an input signal 101, and then the input signal is converted the subtracter 41A into an instantaneous phase signal representing an instantaneous phase change. Then, it is input to a delay circuit 31 with a delay time of, e.g., one symbol, and then the input and output signals of the delay circuit 31 are input to a subtracter 41A. The delay detection is conducted by outputting the difference between the input and output signals to the delay circuit 31. In the demodulation system in Japanese patent application laid-open No.8-32640, the output of the subtracter 41A is input to a determination error operating circuit MOD, 42A. For example, the determination of data is conducted by using 2-bit data corresponding to the symbol phase.

However, in the conventional delay detection system, the code error ratio is deteriorated by the output of the determination circuit due to a noise superposed or a signal lying between radio waves. In this regard, the demodulation system in Japanese patent application laid-open No.8-32640 proposes to improve the delay detection circuit without adding an error correction code. The delay detection circuit of error diffusion type in Japanese patent application laid-open No.8-32640 is provided with delay circuits 31 to 33 with a delay time of, e.g., one symbol. The subtracters 41A, 41B detect phase differences between input and output signals of the delay circuits 31, 33 and output phase difference signals. Then, the determination error operating circuits (MOD) 42A, 42B operate to determine an error between the phase difference determined respectively in the delay detection of 31, 41A and 33, 41B and an ideal phase difference, or operate determine an error by comparing the phase difference between the input and output signals of the delay circuit 31, 33 with a phase point defined on the I-Q phase plane. Then, weighting by multiplying the error signal by a predetermined weight factor at multipliers 43A, 43B, phase correction values 211, 212 are obtained. Then, an adder 44A adds the phase correction value 211 to the first delayed instantaneous phase signal 102 and outputs a first corrected instantaneous phase signal 111. Similarly, a subtracter 44B subtracts the phase correction value 212 from the second delayed instantaneous phase signal 103 and outputs a second corrected instantaneous phase signal 112. The first and second corrected instantaneous phase signals 111, 112 are supplied to a subtracter 45A to obtain the difference therebetween. The output of the subtracter 45A is supplied to a determination circuit (DET) 99, where the determination of data is conducted and the demodulation data are output as a determination result 991.

Thus, by conducting at least one phase correction, the deterioration of error ratio can be improved without adding any error correction code, i.e., without reducing the information transmission speed.

Figure 2:
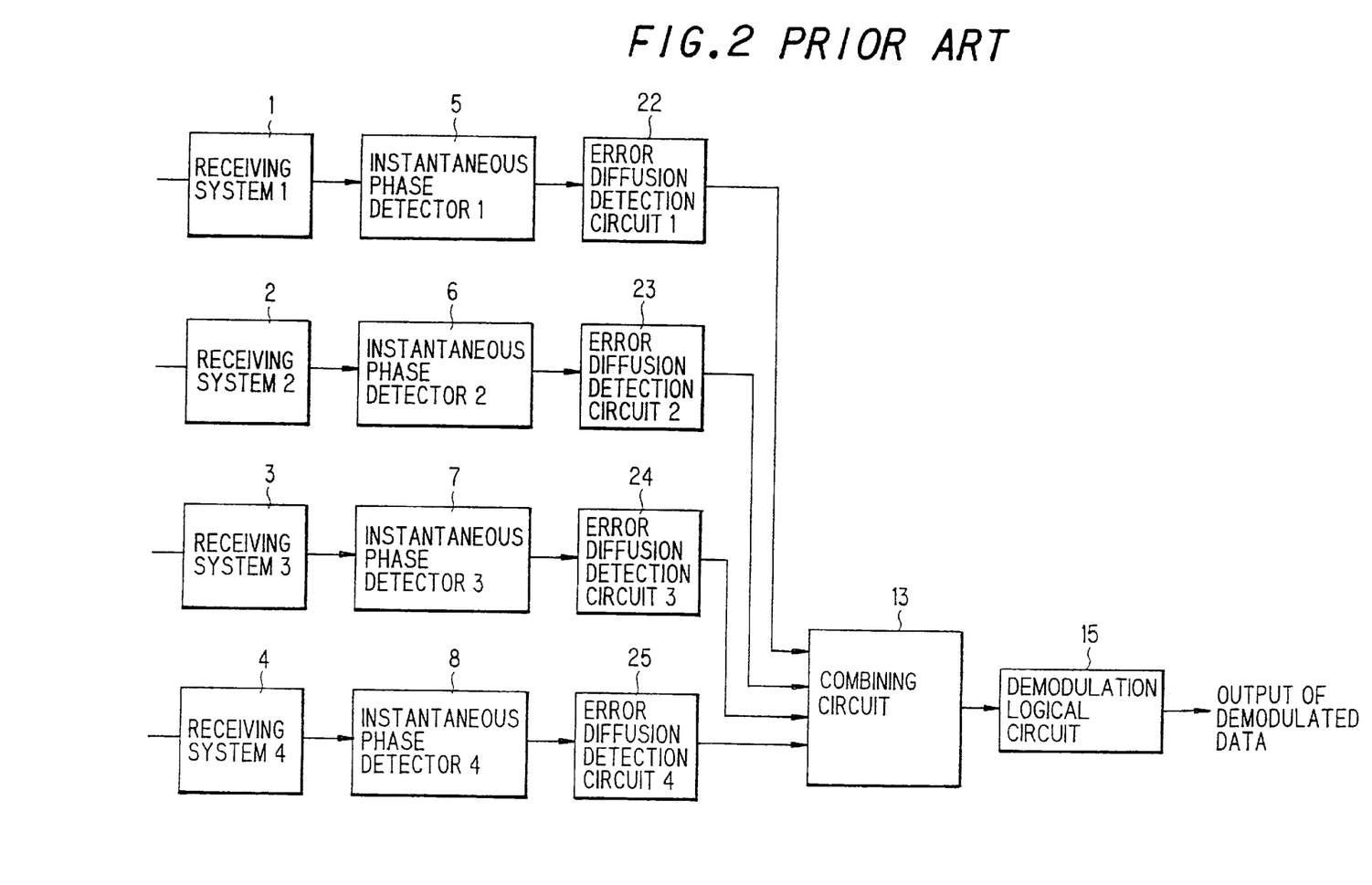
FIG. 2 is a block diagram showing a conventional delay detection demodulation system.

FIG. 2 shows an example where the above delay detection circuit of error diffusion type is applied to a diversity type receiving circuit. As shown in FIG. 2, it is composed of instantaneous phase detectors 5 to 8 for detecting instantaneous phases from baseband signals of respective receiving systems 1 to 4, delay detection circuits of error diffusion type 22 to 25 for detecting the outputs of the instantaneous phase detection circuits 5 to 8 while diffusing the respective errors, a combining circuit 13 for combining the outputs of the delay detection circuits 22 to 25, and a demodulation logical circuit 15 for demodulating the output of the combining circuit 13.

Figure 3:
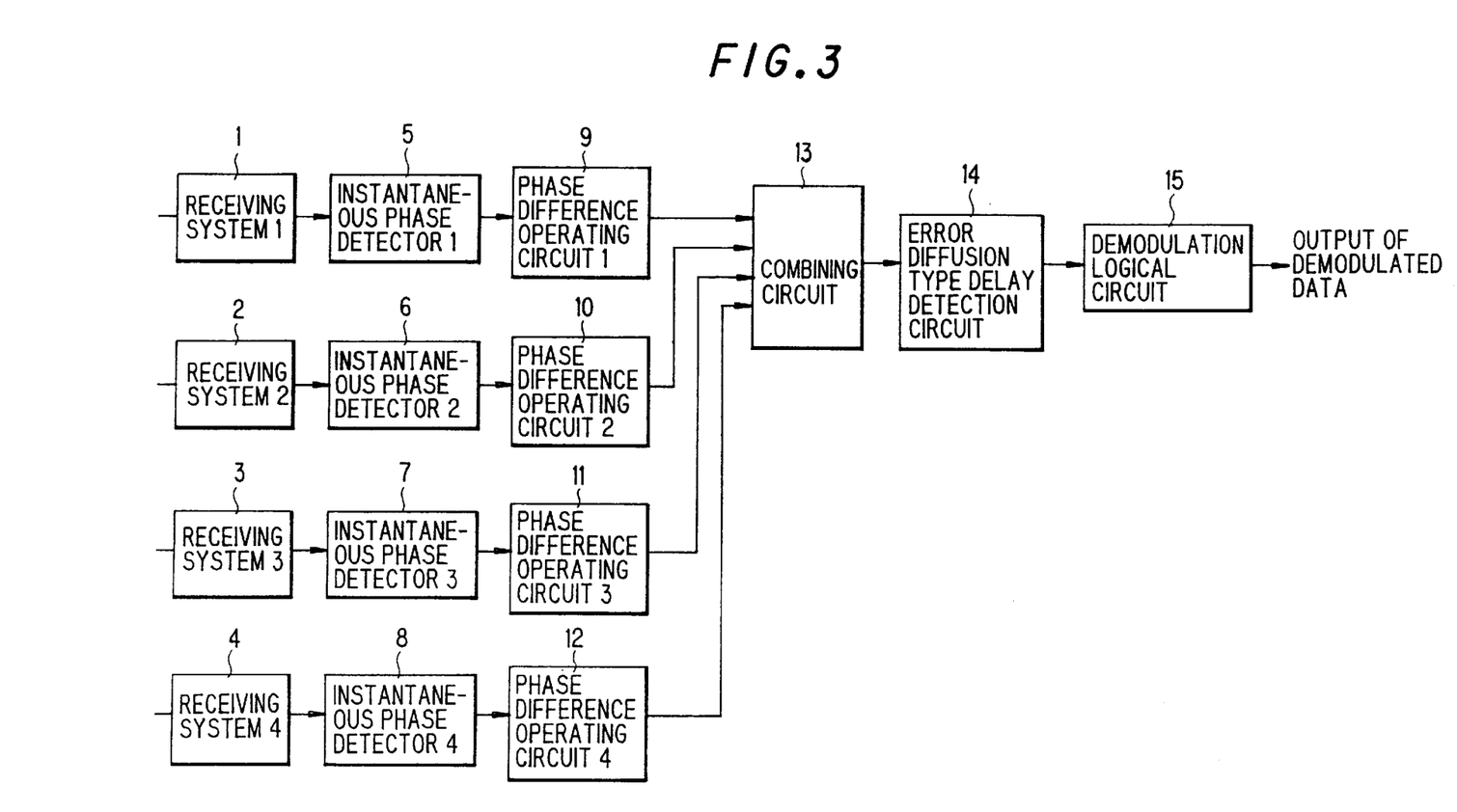
FIG. 3 is a block diagram showing a delay detection demodulation system in a first preferred embodiment according to the invention.

Next, a delay detection demodulation system in the first preferred embodiment will be explained in FIG. 3, wherein like parts are indicated by like reference numerals as used in FIG. 2.

In the first embodiment, the delay detection demodulation system comprises receiving systems 1 to 4 for converting a high-frequency signal into a baseband signal, instantaneous phase detectors 5 to 8 for detecting an instantaneous phase for each of the receiving systems 1 to 4, phase difference operating circuits 9 to 12 for operating to determine an amount of phase change in one symbol section, a combining circuit 13 for combining the amount of phase change in one symbol section, an error diffusion type delay detection circuit 14 for diffusing an error by correcting the combined amount of phase change between multiple symbols, and a demodulation logical circuit 15 for conducting the demodulation.

Figure 4:
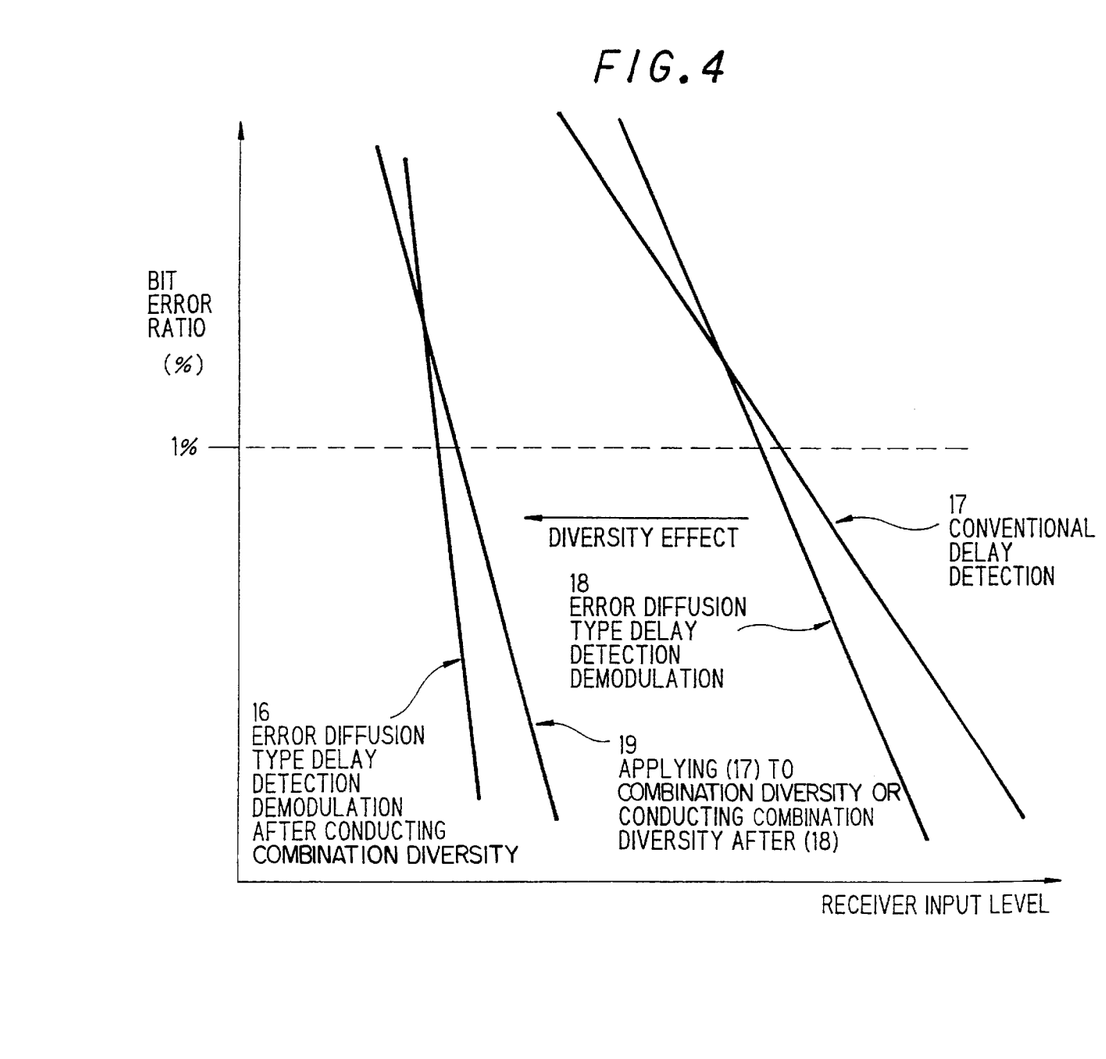
FIG. 4 is a graph showing the relation between bit error ratio and input level of receiver.

FIG.4 is a graph showing the relation between bit error ratio (%) and input level of receiver. Shown in FIG. 4 are a characteristic 17 of the conventional delay detection system that is composed of one delay circuit and a subtracter for calculating a phase difference between input and output signals of the delay circuit, and a characteristic 18 of the error diffusion type delay detection system that is composed of multiple delay circuits and determination error operating circuits (MOD) 42A, 42B which operate to determine an error between the phase difference between input and output signals of the delay circuit and outputting an error signal while weighting, as described with reference to FIG. 1. Further, shown are characteristics 19, 16 in case of the combination diversity that gives a diversity effect by inputting to multiple antennas, receiving, detecting and combining.

Next, the operation of the delay detection demodulation system in the embodiment will be explained with reference to FIGS. 3 and 4. Instantaneous phases of the respective receiving systems 1 to 4 are detected by the instantaneous phase detectors 5 to 8, and then amounts of phase change in one symbol section are determined by the phase difference operating circuits 9 to 12 using the delay circuits, and the outputs are supplied to the combining circuit 13. More specifically, the instantaneous phase difference is detected by the subtracter 41A in FIG. 1 as the instantaneous phase detector 5, and then an error between the phase difference in the delay detection and an ideal phase difference is determined by the determination error operating circuit (MOD) 42A in FIG. 1, or an error signal is determined by comparing the phase difference between the input and output signals of the delay circuit 31 with a phase point defined on the I-Q phase plane. Then, weighting by multiplying the error signal by a predetermined weight factor at the multiplier 43A, the phase correction value 211 is obtained. Thus, for example, as to the receiving system 1, the baseband signal of the received signal is used as the input signal 101 in FIG. 1, the instantaneous phase detector 5 is composed of the delay circuit 31 and the subtracter 41A, and the phase difference operating circuit 9 is composed of the determination error operating circuit 42A and the multiplier 43A. The receiving systems 1 to 4 have the same composition. Also, with the receiving systems 1 to 4, antennas(not shown) to detect radio wave from mobile stations are provided apart from each other.

The high-frequency signal supplied to the receiving systems 1 to 4 includes a noise to be superposed thereon. Therefore, the outputs of the phase difference operating circuits 9 to 12 also include noise errors. The phase difference operation signals corresponding to an amount of phase change in one symbol section including the noise errors are combined by the combining circuit 13. The combining circuit 13 provides a signal which emphasizes the parts where the phase difference operating signals are overlapped, and the signal component becomes high level.

The operation of the combining circuit 13 will be explained below. In case of four receiver combination diversity, the combining phase difference θ is obtained by using the following expressions:

$$I=\gamma_1^2\cos\theta_1+\gamma_2^2\cos\theta_2+\gamma_3^2\cos\theta_3+\gamma_4^2\cos\theta_4$$

$$Q=\gamma_1^2\sin\theta_1+\gamma_2^2\sin\theta_2+\gamma_3^2\sin\theta_3+\gamma_4^2\sin\theta_4$$

$$\tan\theta=\sin\theta/\cos\theta=I/Q$$

where $\theta_1$ to $\theta_4$ are phase differences output from the respective operating circuits 9 to 12, and $\gamma_1$ to $\gamma_4$ are weight factors determined the respective RSSI levels of the receiving systems 1 to 4. Thus, the phase differences output from the respective operating circuits 9 to 12 are first mapped on I or Q axis while being sine/cosine-converted, and, on the other hand, the input levels RSSI 1 to 4 of the receiving systems 1 to 4 are A/D converted and the weight factors used for weighting the respective phase differences are determined based upon the converted values from the input levels RSSI 1 to 4. Then, the phase differences are, as shown in the above expressions, weighted with the weight factors and combined to output the I, Q values. From the I,Q values, the combining phase difference is obtained by conducting $\tan^{-1}$ conversion.

The phase difference operation signal generated by the combining circuit 13 is input to the error diffusion type delay detection circuit 14, where the data error ratio is improved by conducting the phase correction at least one time by, for example, the error diffusion type delay detection circuit in FIG. 1. The output of the error diffusion type delay detection circuit 14 is subject to the determination of data by, for example, the determination circuit 99 in FIG. 1, and then the demodulation of data is conducted by the demodulation logical circuit 15 to detect the original data.

Thus, by conducting previously the combining of phase difference, the noise ratio to the signal component can be improved.

This result is shown by the characteristic 16 in FIG. 4, which proves that the bit error ratio, shown on the y axis, can be improved even when the input level of receiver is lowered. Namely, the level of input signal to the receiving systems 1 to 4 which is needed to obtain the error correction and diffusion effect of the circuit 14 can be improved by part of the combination diversity (compared to the characteristic 19 in FIG. 4).

As explained above, the delay detection between multiple symbols can be conducted by the error diffusion type delay detection circuit, where an error superposed on the received signal can be diffused and corrected, thereby preventing the deterioration of error ratio. The improvement in reception sensitivity by the error diffusion type delay detection is 0.7 dB at the point with an error ratio of $1 \times 10^{-2}$. Further, when it is applied to the combination diversity, the effect of combination diversity can be synergistically obtained with the effect of error diffusion since the error diffusion type delay detection is conducted after the combining.

A delay detection demodulation system in the second preferred embodiment will be explained in FIG. 5, wherein like parts are indicated by like reference numerals as used in FIG. 3.

In the second embodiment, the delay detection demodulation system comprises receiving systems 1 to 4 which are connected to four antennas for space diversity and convert a high-frequency signal into a baseband signal, e.g., a code signal by DQPSK, instantaneous phase detectors 5 to 8 for detecting an instantaneous phase for each of the receiving systems 1 to 4, phase difference operating circuits 9 to 12 for determining an error corresponding to a phase difference signal of each of the receiving systems 1 to 4 and multiplying with a weight factor, a combining circuit 13 for combining the amount of phase change from the outputs of the phase difference operating circuits 9 to 12, a delay circuit 20 and an adder for conducting error correction, an error diffusion type delay detection circuit 14, and a demodulation logical circuit 15 for conducting the demodulation from the output of the delay detection circuit 14.

The delay circuit 20 and adder 21 conduct the conversion of a phase difference signal into an instantaneous phase signal to detect the shift from an ideal phase difference and add a correction value to the instantaneous phase. To obtain an instantaneous combining phase from a combining phase difference to be output from the combining circuit 13, a delay of one symbol period is conducted, adding a combining signal before the delay and a combining signal after the delay, then reproducing the instantaneous phase after the combination.

Next, the operation of the delay detection demodulation system in the embodiment will be explained with reference to FIGS. 4 and 5. An amount of phase change in one symbol section for each of the receiving systems 1 to 4 is obtained by the phase difference operating circuits 9 to 12, and then the output is supplied to the combining circuit 13.

The high-frequency signal supplied to the receiving systems 1 to 4 includes a noise to be superposed thereon. Therefore, the outputs of the phase difference operating circuits 9 to 12 also include noise errors. However, by conducting previously the combining of phase difference, the noise ratio to the signal component can be improved as shown by the characteristic 16 in FIG. 4. Namely, the level of input signal to the receiving systems 1 to 4 which is needed to obtain the error correction and diffusion effect of the circuit 14 can be improved by part of the combination diversity, as compared to the characteristic 19 in FIG. 4.

Meanwhile, the combining phase difference needs to be converted into the instantaneous phase data since the error diffusion type delay detection circuit 14 diffuses the errors of symbols lying before and after and is subject to the correction by symbols lying before and after by detecting the shift from an ideal phase difference and adding a correction value to the instantaneous phase. Accordingly, the output of the combining circuit 13 and the combining phase difference one symbol before whose timing is delayed by the delay circuit 20 are accumulated by the adder 21.

Figure 5:
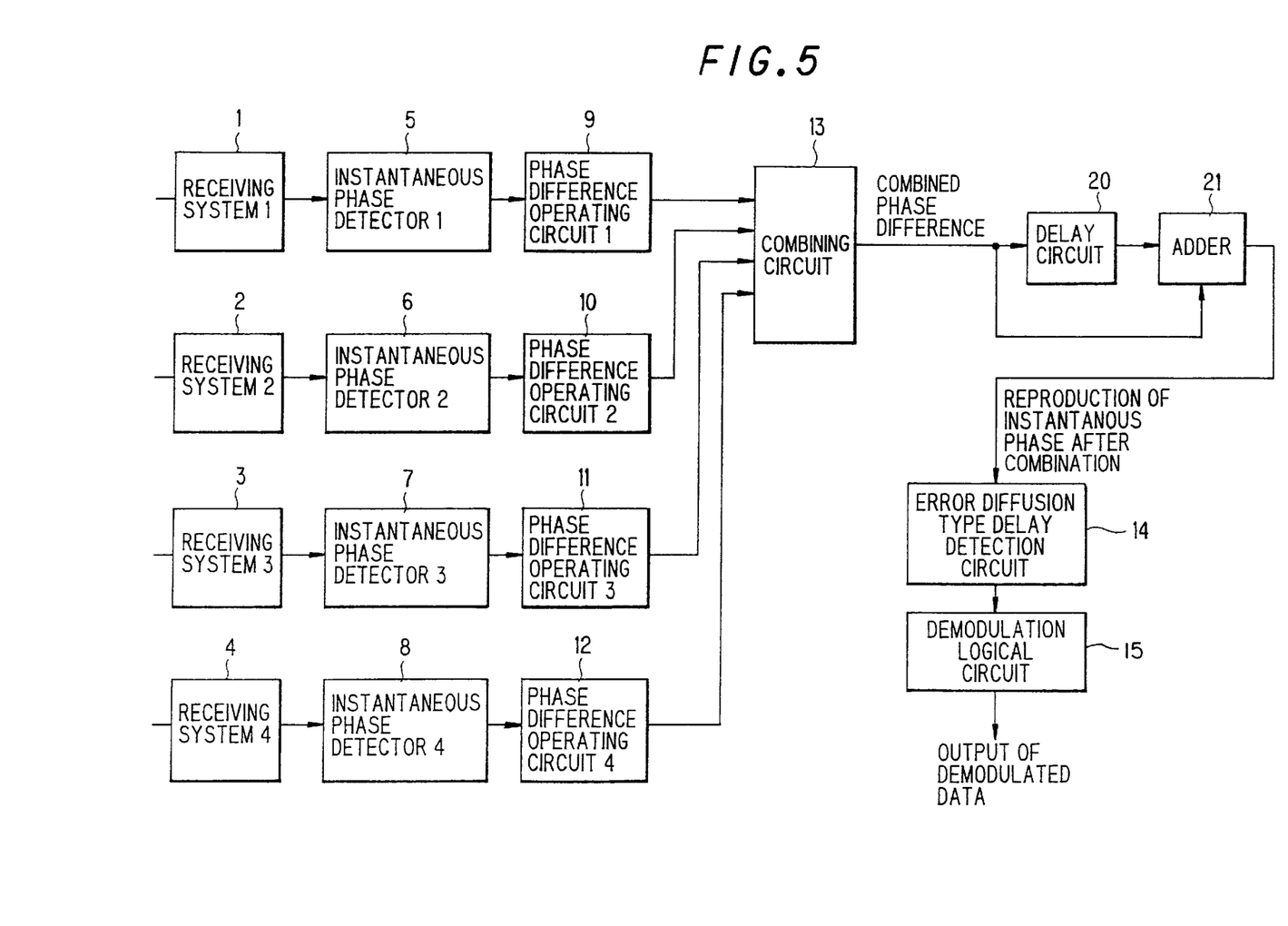
FIG. 5 is a block diagram showing a delay detection demodulation system in a second preferred embodiment according to the invention.

Though the embodiment shown in FIG. 5 is described as to four-receiver combination diversity, the number of receivers may be other than four. Also, the instantaneous phase instead of the phase difference may be combined.

Also, when the correction of error is conducted to the phase difference instead of to the instantaneous phase in the delay detection, the delay circuit 20 and the adder 21 are not necessary.

Further, in the demodulation system where the errors are mutually corrected between multiple symbol sections and are diffused to symbols lying before and after, another detection system, such as synchronous detection system, other than the delay detection may be applied.

In the above embodiments, the improvement in error ratio can be, as shown in FIG. 4, obtained even when the level of input signals from the diversity antennas is low. Thus, the improvement of error ratio can be synergistically obtained by both the diversity effect and the error diffusion type delay detection. In the error diffusion type delay detection circuit, the error ratio can be further improved by using five or seven delay circuits other than the three delay circuits shown in FIG. 1. Therefore, further multiple stage delay circuits may be used in the invention.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A delay detection demodulation system, comprising:
   a plurality of receiving systems;
   a plurality of instantaneous phase detecting circuits for detecting an instantaneous phase from the output of each of said plurality of receiving systems;
   a plurality of chase difference operating circuits for determining a phase difference in one symbol section from the output of each of said plurality of instantaneous phase detecting circuits;
   a combining circuit for combining the outputs of said plurality of phase difference operating circuits;
   a delay detection circuit for conducting error diffusion type delay detection after the combining of said combining circuit; and
   a demodulation logical circuit for conducting demodulation logical operation.

2. A delay detection demodulation system, according to claim 1, wherein:
   said delay detection circuit diffuses an error caused by a noise superposed on a received signal by mutually correcting between symbols.

3. A delay detection demodulation system, according to claim 1, wherein:
   each of said plurality of operating circuits has a multiplying circuit for multiplying with a predetermined weight factor.

4. A delay detection demodulation system, according to claim 1, wherein:
   said delay detection circuit conducts the delay detection after converting a phase difference combined by said combining circuit into an instantaneous phase by using a delay circuit and an adder.

* * * * *

UNITED STATES PATENT AND TRADEMARK OFFICE
CERTIFICATE OF CORRECTION

PATENT NO.    : 6,122,333
DATED         : September 19, 2000
INVENTOR(S)   : K. Nagashima It is certified that error appears in the above-identified patent and that said Letters Patent is hereby corrected as shown below:

Column 1,
Line 17: "in" should read --In--

Column 2,
Line 8: "adelay" should read --a delay--
Line 53 & 54: "the subtracter 41A" should read --by instantaneous phase detector 30--
Line 59: "by outputting" should read --by the subtractor 41A outputting--

Column 7, Claim 1,
Line 8: "chase" should read --phase--

Signed and Sealed this

Thirty-first Day of July, 2001

Attest:

NICHOLAS P. GODICI
Attesting Officer    Acting Director of the United States Patent and Trademark Office